(12) United States Patent
Karbaschi et al.

(10) Patent No.: US 10,690,574 B2
(45) Date of Patent: Jun. 23, 2020

(54) CHILLING APPARATUS

(71) Applicants: Mahsa Karbaschi, Miami, FL (US); Marcus S. Cooke, Miami, FL (US)

(72) Inventors: Mahsa Karbaschi, Miami, FL (US); Marcus S. Cooke, Miami, FL (US)

(73) Assignee: THE FLORIDA INTERNATIONAL UNIVERSITY BOARD OF TRUSTEES, Miami, FL (US)

(*) Notice: Subject to any disclaimer, the term of this patent is extended or adjusted under 35 U.S.C. 154(b) by 155 days.

(21) Appl. No.: 15/152,152

(22) Filed: May 11, 2016

(65) Prior Publication Data

US 2017/0328822 A1 Nov. 16, 2017

(51) Int. Cl.
*F25D 3/08* (2006.01)
*G01N 1/42* (2006.01)
*G01N 27/447* (2006.01)

(52) U.S. Cl.
CPC ......... *G01N 1/42* (2013.01); *G01N 27/44708* (2013.01); *G01N 27/44756* (2013.01); *F25D 3/08* (2013.01); *F25D 2303/0845* (2013.01); *F25D 2331/812* (2013.01)

(58) Field of Classification Search
CPC ........ G01N 1/42; G01N 25/00; G01N 25/145; G01N 25/4826; G01N 25/486; G01N 25/4846; G01N 25/4853; G01N 2035/00346; G01N 2035/00425; G01N 2035/00445; G01N 23/20025; G01N 23/20033; F25D 3/02; F25D 3/06; F25D 3/105; F25D 2303/08; F25D 2303/081; F25D 2331/812; F25D 2331/804; B01L 3/00; B01L 3/5085; B01L 3/50851; B01L 3/50855; B01L 9/00; B01L 9/52; B01L 9/523

See application file for complete search history.

(56) References Cited

U.S. PATENT DOCUMENTS

| | | | | |
|---|---|---|---|---|
| 647,388 | A * | 4/1900 | Evans | A47L 4/00 134/88 |
| 2,935,205 | A * | 5/1960 | Higgin | A47F 7/281 211/59.4 |
| 3,532,221 | A * | 10/1970 | Kaluhiokalani | A45D 44/02 211/70.6 |
| 3,778,232 | A * | 12/1973 | McMorrow, Jr. | B01L 9/06 422/65 |
| 3,908,395 | A * | 9/1975 | Hobbs | F25C 1/10 62/346 |
| D244,982 | S * | 7/1977 | Parra | D6/675.2 |

(Continued)

*Primary Examiner* — Jianying C Atkisson
*Assistant Examiner* — Miguel A Diaz
(74) *Attorney, Agent, or Firm* — Saliwanchik, Lloyd & Eisenschenk

(57) ABSTRACT

The subject invention provides an apparatus for cooling and/or freezing samples. In an exemplary embodiment, the apparatus is a stackable chilling plate used in a comet assay. In specific embodiments, the chilling plate can accommodate glass slides deposited with an agarose gel suspension, wherein the gel is cured by a refrigerant disposed underneath a thermally-conductive top plate. Advantageously, the cooling/freezing apparatus provided herein can easily accommodate the placement of multiple cellular sample slides in a compact configuration.

20 Claims, 5 Drawing Sheets

(56) References Cited

U.S. PATENT DOCUMENTS

| | | | | |
|---|---|---|---|---|
| 4,039,247 A * | 8/1977 | Lawman | G02B 21/34 | 356/246 |
| 4,147,324 A * | 4/1979 | Walter | F41J 1/01 | 249/170 |
| 4,366,941 A * | 1/1983 | Harris | F25C 1/22 | 206/511 |
| 4,424,687 A * | 1/1984 | Morgan | F25D 3/08 | 62/457.1 |
| 4,641,329 A * | 2/1987 | Green | G01N 23/20025 | 378/70 |
| 5,520,010 A * | 5/1996 | Altman | A23L 3/364 | 100/195 |
| 6,118,582 A * | 9/2000 | Del Buono | B01L 3/50855 | 359/391 |
| 6,191,480 B1 * | 2/2001 | Kastberg | H01L 23/4006 | 257/692 |
| 6,309,608 B1 * | 10/2001 | Zhou | B01J 19/0046 | 210/321.75 |
| D506,833 S * | 6/2005 | Wescott, III | B01L 9/06 | 422/411 |
| 7,258,240 B2 * | 8/2007 | Wescott, III | B01L 9/06 | 206/563 |
| 9,128,046 B2 * | 9/2015 | Samson | G01N 27/44756 | |
| 2004/0023371 A1 * | 2/2004 | Fawcett | B01L 7/52 | 435/303.1 |
| 2004/0126283 A1 * | 7/2004 | Backes | B01L 3/00 | 422/552 |
| 2005/0135974 A1 * | 6/2005 | Harvey | B01L 3/50855 | 422/400 |
| 2005/0165287 A1 * | 7/2005 | Wescott, III | B01L 9/06 | 600/322 |
| 2006/0154232 A1 * | 7/2006 | Degel | A01N 1/02 | 435/2 |
| 2006/0213206 A1 * | 9/2006 | Linder | F25B 21/02 | 62/3.6 |
| 2006/0288730 A1 * | 12/2006 | Shill | F25D 3/08 | 62/457.2 |
| 2008/0029248 A1 * | 2/2008 | Magnant | B01L 7/00 | 165/104.19 |
| 2008/0289359 A1 * | 11/2008 | Godowski | A47G 23/0683 | 62/457.6 |
| 2009/0282860 A1 * | 11/2009 | Shaw | A47G 23/0683 | 62/457.6 |
| 2010/0083778 A1 * | 4/2010 | Harris | B01L 3/50855 | 73/865.8 |
| 2010/0084405 A1 * | 4/2010 | Seiler | A61J 1/165 | 220/553 |
| 2010/0147014 A1 * | 6/2010 | Kim | A47G 19/027 | 62/457.6 |
| 2011/0122913 A1 * | 5/2011 | Scharer | G01N 25/486 | 374/29 |
| 2011/0266181 A1 * | 11/2011 | Morozov | B01L 3/508 | 206/456 |
| 2012/0207646 A1 * | 8/2012 | Osaka | G01N 35/025 | 422/68.1 |
| 2012/0240597 A1 * | 9/2012 | Hong | B01L 7/00 | 62/3.6 |
| 2013/0105320 A1 * | 5/2013 | Samson | G01N 27/44756 | 204/461 |
| 2014/0014644 A1 * | 1/2014 | Akiba | H01L 21/67103 | 219/444.1 |
| 2014/0338702 A1 * | 11/2014 | Kim | G01N 1/34 | 134/18 |
| 2014/0338859 A1 * | 11/2014 | Haber | A23L 3/36 | 165/67 |
| 2015/0153088 A1 * | 6/2015 | Kim | F25D 3/08 | 62/457.4 |
| 2015/0360422 A1 * | 12/2015 | Nemir | B29C 67/04 | 264/84 |
| 2016/0096175 A1 * | 4/2016 | Pallas | B01L 3/50851 | 506/7 |
| 2016/0231260 A1 * | 8/2016 | Jansson | G01N 25/486 | |
| 2016/0272405 A1 * | 9/2016 | Furneaux | F25D 23/028 | |
| 2017/0023292 A1 * | 1/2017 | Marinelli | F25D 3/08 | |
| 2017/0042374 A1 * | 2/2017 | Young | B65D 81/3484 | |
| 2017/0341834 A1 * | 11/2017 | Warden | B01L 3/50851 | |
| 2018/0067096 A1 * | 3/2018 | Pedao | A61B 6/12 | |
| 2018/0127007 A1 * | 5/2018 | Kravchenko | F25D 3/06 | |
| 2019/0178569 A1 * | 6/2019 | Gami | F25D 29/001 | |

* cited by examiner

CHILLING APPARATUS

BACKGROUND OF INVENTION

The comet assay, sometimes referred to as single cell gel electrophoresis (SCGE), is commonly used to measure the presence and extent of DNA damage induced by acute or chronic exposure to chemicals and/or radiation. It has gained popularity as a standard technique for the evaluating DNA damage and repair, biomonitoring, and genotoxicity testing.

A conventional comet assay involves, in sequence, encapsulating cells in a low-melting-point agarose suspension, lysing the cells in neutral or alkaline conditions to break down the cell membranes and expose the nucleoid, conducting electrophoresis of the nucleoids, and staining the nucleoids to visually and quantitatively determine the extent of DNA damage. The resulting electrophoresis patterns often resemble the shape of a comet, hence the name given to this technique.

The comet assay, similar to other cell separation and extraction techniques, requires a clean, level working surface that serves to chill the sample slides that are covered by the agarose gel encapsulating the cells to be examined. Because the agarose gel is typically cured (i.e., solidified) at a low temperature (approximately 4° C.), a chilling plate is required.

Currently available comet assay apparatuses utilize one of two mechanisms for cooling. The first mechanism involves cooling using ice that is housed in a container, the container being situated beneath a thermally conductive tray upon which the sample slides, with agarose gel, are placed. The second mechanism is by electrical cooling as described by Samson et al. (U.S. Pat. No. 9,128,046 B2).

Neither of these cooling techniques is ideal. In the case of cooling by ice, periodically filling the container with fresh ice is necessary to maintain a steady cooling temperature, uneven thawing of the ice upsets the balance of the thermally conductive tray, and formation of condensation are examples of unwanted side effects. On the other hand, an electrical cooling system typically requires additional energy input. Also, apparatuses operating on these two mechanisms require a considerable amount of space for equipment setup and can only accommodate a limited number of slides.

As a result, there still remains a need for a more convenient, space-saving, and easy-to-maintain system for handling and processing cell samples for comet assays, and other applications, where cooling and/or freezing is required.

BRIEF SUMMARY

The subject invention provides an apparatus for conveniently and efficiently cooling and/or freezing samples. In an exemplary embodiment, the apparatus comprises a space-saving stackable modular chilling system that can be used for chilling samples in, for example, a comet assay.

In specific embodiments, each chilling module comprises a thermally-conductive platform (plate) upon which samples, or, more commonly, an item such as a glass slide that holds a sample, can be placed. For example, a glass slide can have deposited thereon an agarose gel suspension, wherein the glass slide can be placed on the thermally-conductive plate and the gel is then cured by a refrigerant disposed, in a refrigerant space, underneath the thermally-conductive plate.

Thus, in one aspect, the subject invention provides an apparatus for chilling samples, comprising at least one thermally-conductive top plate disposed above a base plate. The top plate, upon which samples (or containers holding samples) can be placed, is disposed above the base plate such that a space (the refrigerant space) exists between the base plate and the thermally-conductive top plate such that a refrigerant material (or a container holding a refrigerant material) can be placed in the refrigerant space. The refrigerant material is then in intimate thermal contact with a sample that is placed on the thermally-conductive top plate.

Typically, the surface area of a base plate is at least as large as the surface area of a top plate disposed above the base plate. In certain embodiments, multiple top plates can be placed, for example side-by-side, above a single base plate. In exemplary embodiments, the top plate and the base plate are rectangular.

The top plate can be fixedly disposed above the bottom plate by supports located at, for example, opposite edges of the top and bottom plates, and/or at the corners of the plates. In certain embodiments, the top plate can be removable.

The space between a base plate and a top plate (the refrigerant space) is adapted to receive at least one refrigerant material, wherein the refrigerant material (or a container holding a refrigerant material) is, preferably, slidably movable into, and out of, the refrigerant space between adjacent bottom and top plates. In certain embodiments, the bottom plate is a thermal insulator. In additional embodiments, the refrigerant space may be defined by one or more side walls. The side walls may comprise a thermal insulating material.

The chilling apparatus may have multiple modules, each of which comprises a bottom plate and a thermally-conductive top plate, wherein each additional set of bottom and top plates (a chilling module) can be situated directly above the plates (modules) beneath it in the apparatus, thereby saving laboratory bench space. Also, preferably, the apparatus maintains a stable and horizontally level environment for the optimal success of the curing process.

Advantageously, the cooling/freezing apparatus provided herein can readily accommodate the placement of multiple samples (or sample containers, such as slides) in a compact configuration.

In some embodiments, the subject apparatus is used to chill and/or freeze cellular/subcellular and/or tissue samples. In an exemplary embodiment, the apparatus is used to chill and cure a polysaccharide gel, e.g., low-melting point agarose, used in a comet assay.

In another aspect, the subject invention provides a method of chilling samples, comprising providing the subject apparatus, introducing a refrigerant material into the space (the refrigerant space) between a base plate and a thermally-conductive top plate, and placing one or more samples (or containers holding samples) on the thermally-conductive top plate.

In certain embodiments, the refrigerant material is non-toxic and is characterized by having a high heat capacity. In an exemplary embodiment, the refrigerant material is water.

BRIEF DESCRIPTION OF THE DRAWINGS

In the following detailed description, reference is made to the accompanying drawings, depicting exemplary, non-limiting and non-exhaustive embodiments of the invention.

DETAILED DISCLOSURE

The subject invention provides an apparatus for conveniently and efficiently cooling and/or freezing samples. In an exemplary embodiment, the apparatus comprises a space-saving stackable modular chilling system that can be used for chilling samples in, for example, a comet assay.

Figure 1:
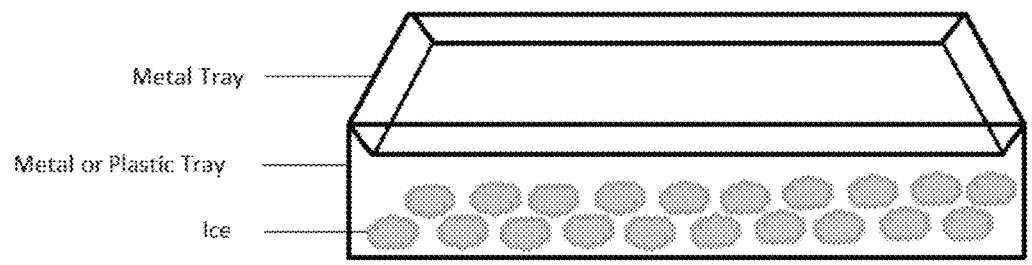
FIG. 1 (prior art) shows an example of a conventional ice tray used in comet assay.
Figure 2A:
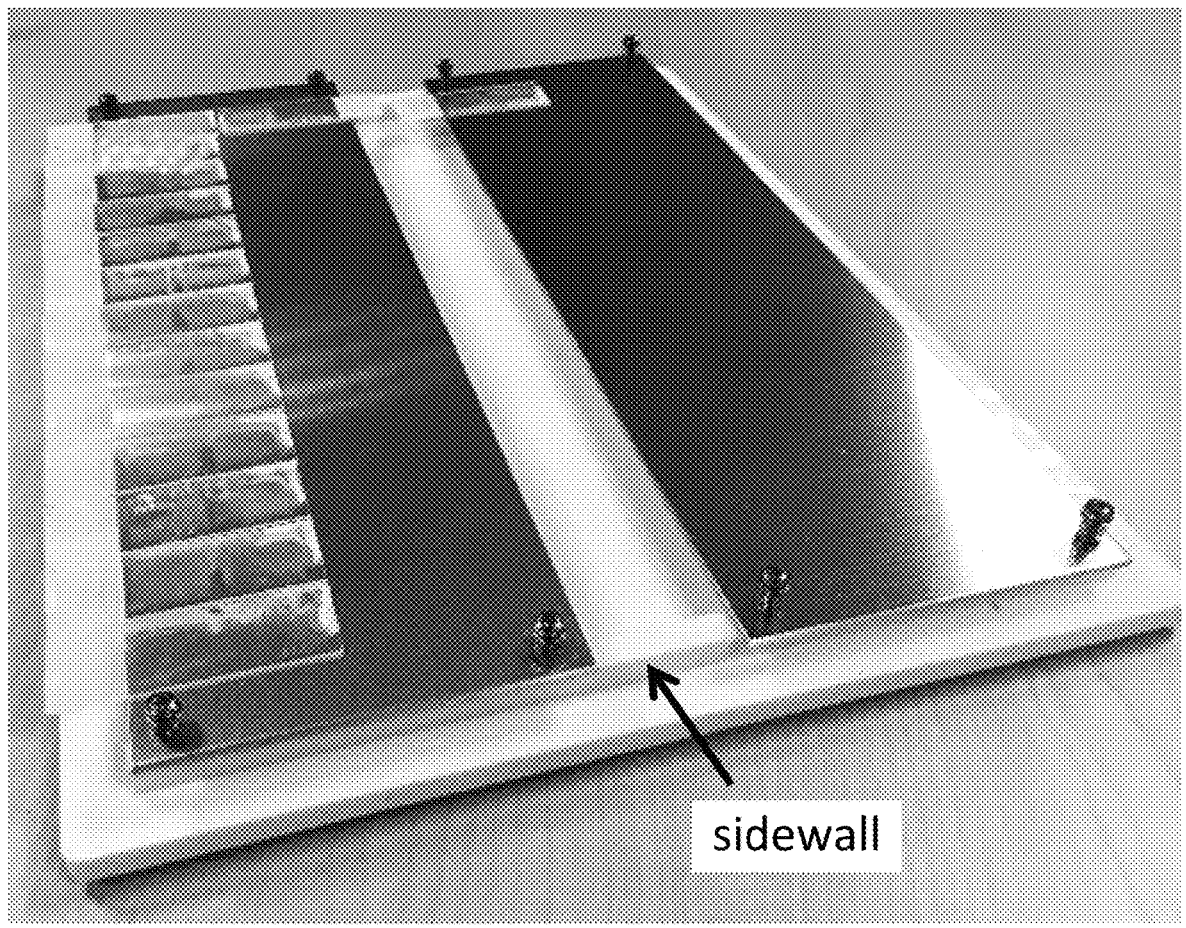
FIG. 2A shows a first view of an exemplary embodiment of the chilling plate of the subject invention. In this view, thermally conductive top plates are shown with a plurality of sample carriers arranged on the flat upper surface.
Figure 2B:
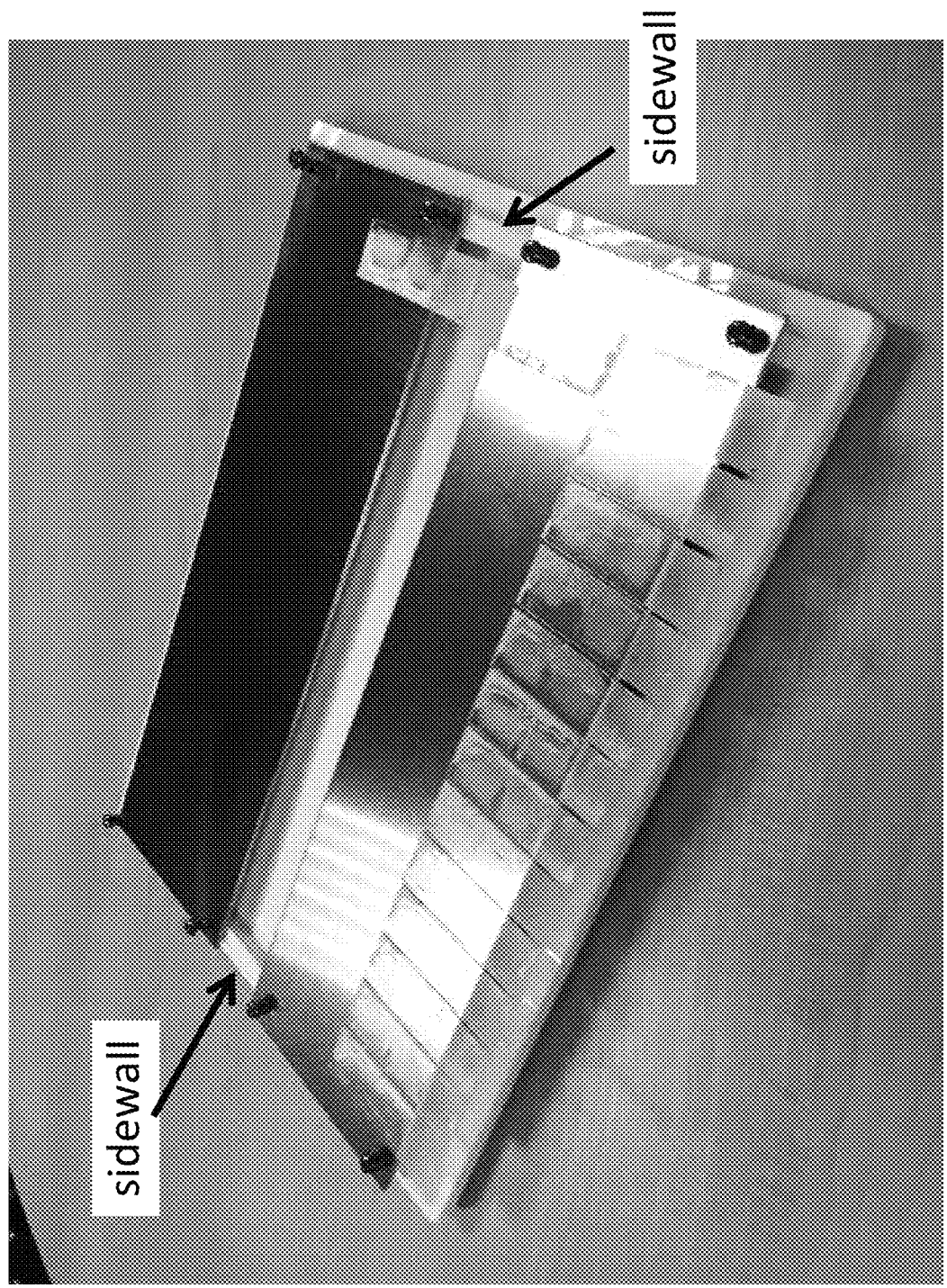
FIG. 2B shows a second view of an exemplary embodiment of the chilling plate of the subject invention. In this view, it can be seen that a plurality of sample carriers can be arranged on both sides of the thermally conductive top plates.

In specific embodiments, each chilling module can accommodate the placement, upon a top thermally-conductive plate, of glass slides, as shown in FIGS. 2A and 2B, having deposited thereon an agarose gel suspension, wherein the gel is gradually cured by at least one refrigerant disposed underneath the thermally-conductive top plate of the module. Advantageously, the cooling/freezing apparatus provided herein can readily accommodate the placement of multiple samples in a compact configuration, as shown, for example, in FIG. 3.

Figure 3:
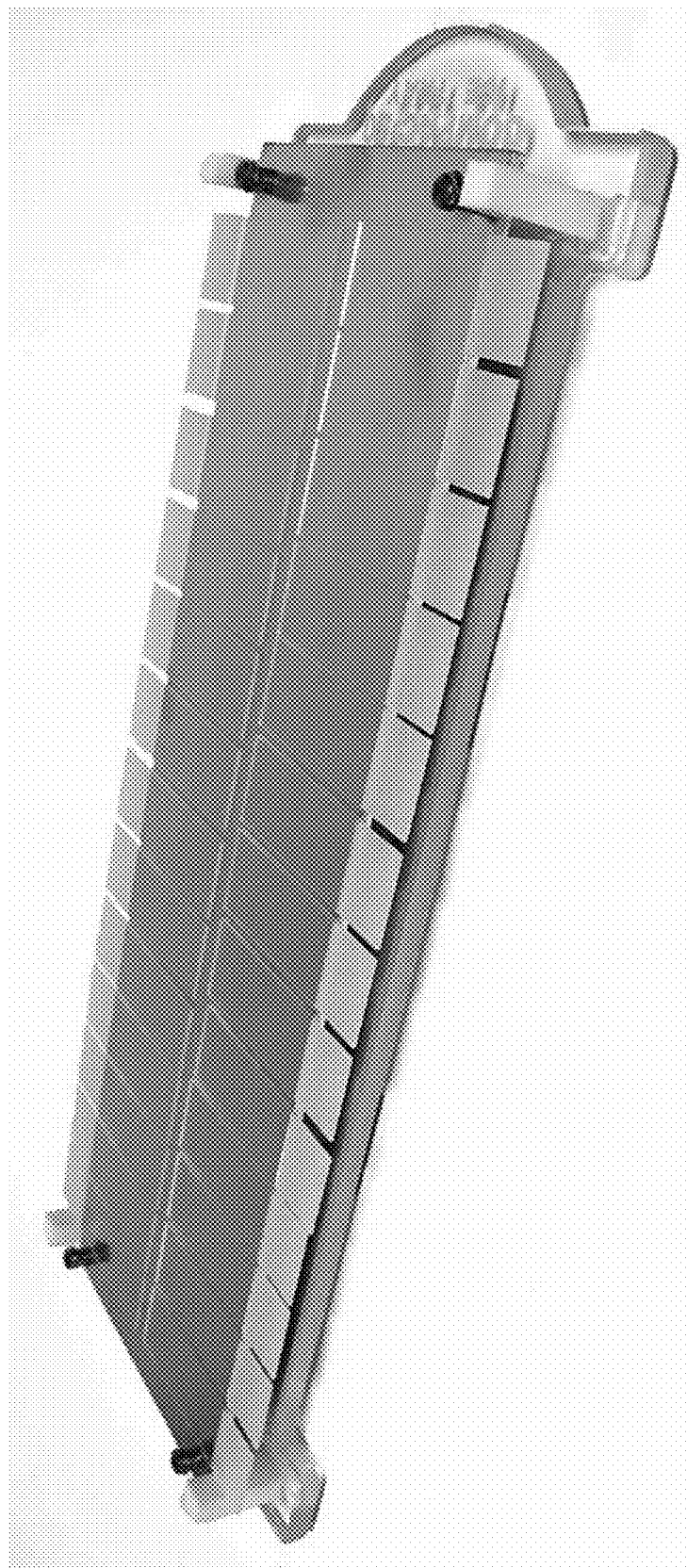
FIG. 3 is an image of an exemplary embodiment of the chilling plate having one upper plate with 26 sample slides in place.

Thus, in one aspect, the subject invention provides an apparatus for chilling samples, comprising at least one thermally-conductive top plate disposed above a base plate. The top plate, upon which samples (or containers holding samples) can be placed, is disposed above the base plate such that a space (the refrigerant space) exists between the base plate and the thermally-conductive top plate such that a refrigerant material (or a container holding a refrigerant material) can be placed in the refrigerant space. FIG. 3 illustrates an example of a chilling apparatus with a single top plate. The refrigerant material is then in thermal connectivity with a sample that is placed on the thermally-conductive top plate.

Figure 2C:
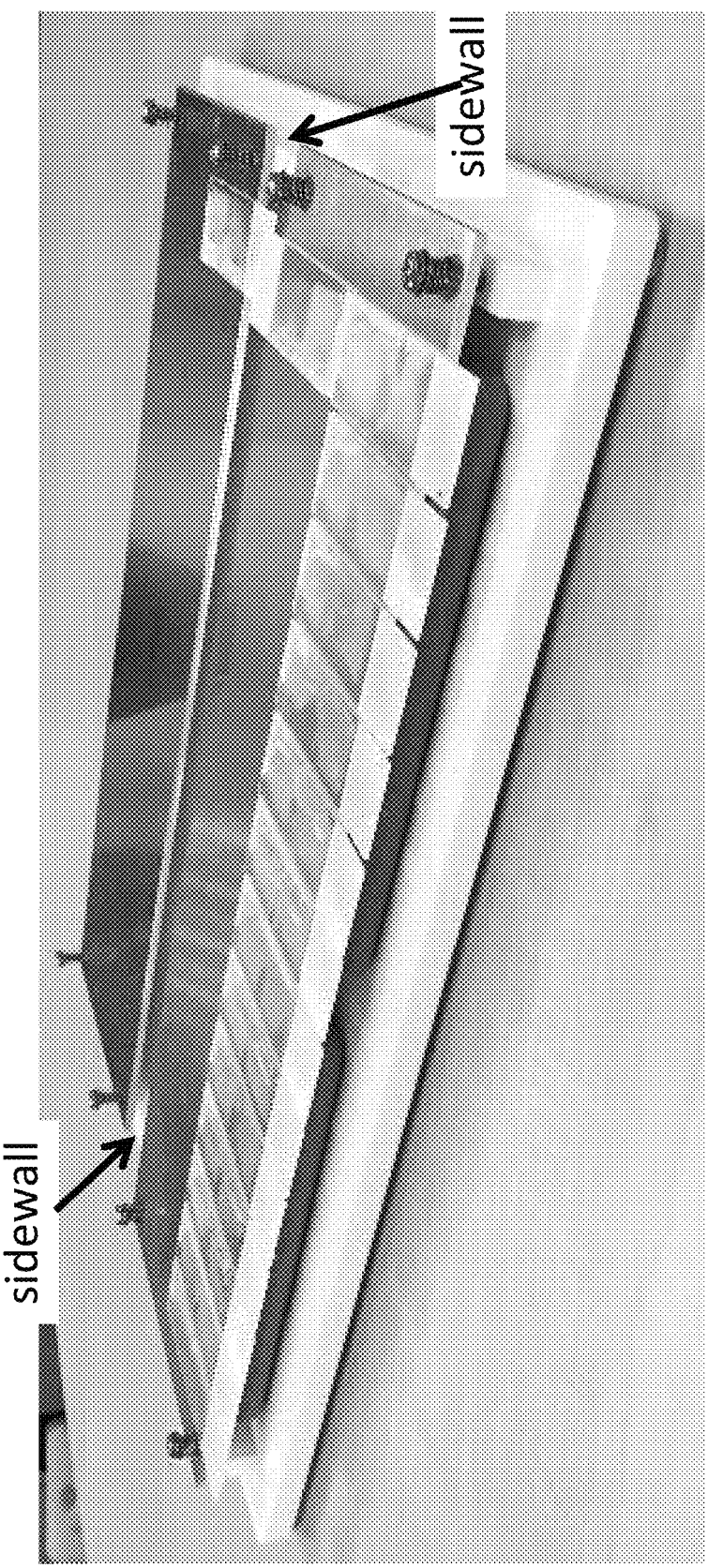
FIG. 2C shows a third view of an exemplary embodiment of the chilling plate of the subject invention. A refrigerant material is shown between the top and bottom plates. The top plate is biased by springs to maintain thermal connectivity with the refrigerant material.

Typically, the surface area of a base plate is at least as large as the surface area of a top plate disposed above the base plate. In certain embodiments, multiple top plates can be placed, for example side-by-side, above a single base plate, an example of which, is shown in FIGS. 2A, 2B, and 2C. In exemplary embodiments, the top plate(s) and the base plate are rectangular.

Figure 4A:
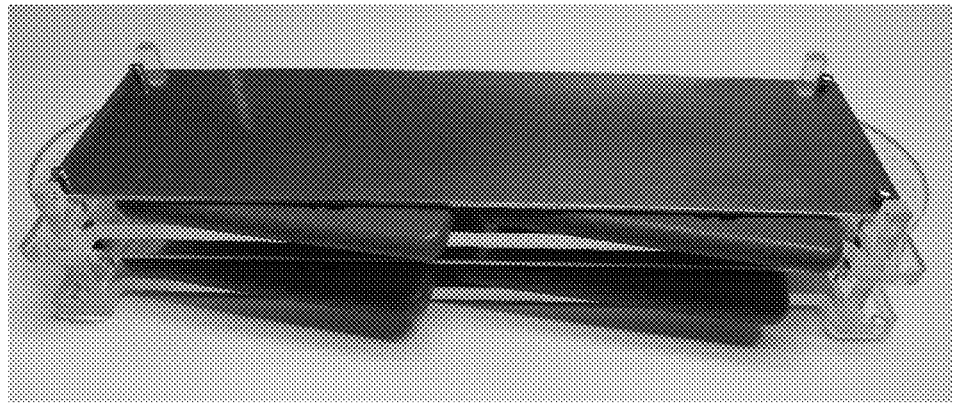
FIG. 4A is an image of two exemplary chilling plates stacked vertically together with containers of refrigerant material slidably placed in between the thermally conductive top plate and the base plate.

The space between a base plate and a top plate (the refrigerant space) is adapted to receive at least one refrigerant material, wherein the refrigerant material is, preferably, slidably movable into, and out of, the refrigerant space between adjacent bottom and top plates, as demonstrated in FIG. 4A. In certain embodiments, the bottom plate comprises a thermal insulating material. In additional embodiments, the refrigerant space may be defined by one or more side walls, as shown, by way of example, in FIGS. 2A, 2B, and 2C.

In a specific embodiment, the subject invention provides an apparatus for chilling samples, comprising at least one flat, thermally-conductive top plate and a flat base plate, wherein the top plate is affixed above the flat base plate by at least two supports disposed along opposite edges of the plates, and/or at the corners of the plates. FIGS. 2A, 2B, and 2C show an example of a support under the opposite edges of a top plate. In one embodiment, the top plate may be removable from the supports that hold it above the base plate.

Figure 4B:
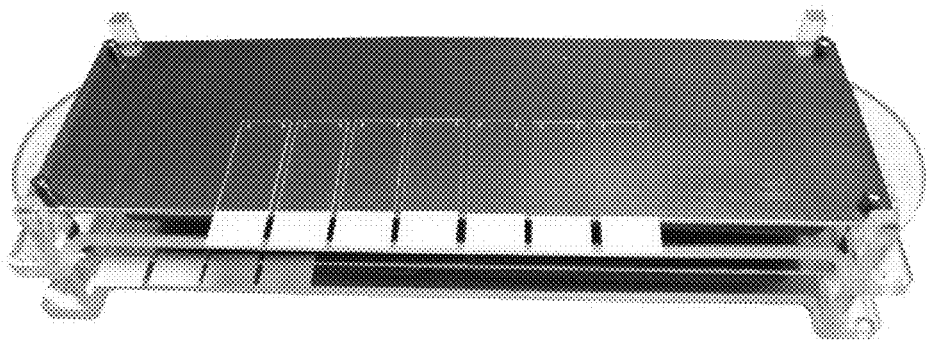
FIG. 4B is an image of two exemplary chilling plates stacked vertically together with containers of refrigerant material placed in between the thermally conductive top plate and the base plate and sample slides placed on each of the two thermally conductive top plates.

In some embodiments, the supports used to affix a top plate to the base plate can be fasteners, such as, for example, small posts, at the corners and/or sides such that the top plate is supported above the bottom plate. In a preferred embodiment where the top plate is rectangular, fasteners disposed at the four corners of the top plate are used to affix the top plate to the base plate. FIGS. 4A and 4B show posts at four corners of a top plate that support the top plate above the bottom plate.

In some embodiments, the top plate can be sterilized using an art-recognized method prior to the placement of a sample or sample carriers.

Preferably, each top plate comprises a thermally conductive material. Many metallic materials, in elemental or alloy forms, are thermally conductive with non-limiting examples including steel, stainless steel, aluminum, copper, nickel, gold, and silver. Non-metallic materials such as certain polymers, carbon allotropes and metallic oxides are also thermally conductive. Furthermore, materials having thermal conductivity of at least 20 W/m·K can also be used as materials of choice for the top plates. In a preferred embodiment, the top plate comprises a metallic thermal conductor. In another embodiment, the top plate has openings capable of transmitting heat such that the sample is in thermal connectivity with the refrigerant material via the openings.

The length and/or width of the plates may be, for example, between 1 foot and 6 feet, including all lengths in between. The distance between the top and bottom plates within a chilling module (the refrigerant space) may be, for example, 1 inch to 1 foot, and all distances in between.

The bottom plate may be a thermal insulator to conserve the refrigerant and/or to reduce condensation. There also may be side walls, as shown in the examples in FIGS. 2A, 2B, and 2C, disposed between the top and bottom plates. These side walls can comprise thermal insulators to conserve refrigerant and/or help maintain a more constant temperature within and above the refrigerant space.

In some embodiments, the apparatus comprises a slidable drawer disposed between the top plate and the base plate, wherein the slidable drawer can house the refrigerant material. The slidable drawer may comprise, for example, a receptacle into which a refrigerant can be placed. The slideble drawer may be completely removable from the apparatus or it may be attached to, for example, an axis about which it can rotate allowing it to, in one position be outside the boundaries of the plates (in order to allow easy insertion of the refrigerant) and, in a second position, be rotated into the refrigerant space between the base plate and the thermally-conductive top plate. In one embodiment, the refrigerant material is kept in intimate thermal contact with the thermally-conductive top plate through being under compression between the top and bottom plates.

In an alternative embodiment, a spring can be arranged on or around a support, such as shown in FIGS. 2A-2C and FIG. 3. The spring can contact the top plate to bias it towards the refrigerant space, thereby maintaining intimate thermal contact with the refrigerant material.

In some embodiments, the refrigerant material is non-toxic and non-corrosive, and is characterized by having a high heat capacity. Non-limiting examples include water and certain liquids that maintain a gel-like consistency during their operating temperature range. Non-limiting examples of these gel-like liquids include hydroxyethyl cellulose, sodium polyacrylate, and vinyl-coated silica gel. Optionally, the refrigerant material comprises freezing point depressants and/or thickening agents. In some embodiments, the refrigerant material is contained in a flexible package such that the package with the refrigerant material contained therein can be compressed when inserted into the refrigerant space to maximize thermal contact with the plates above and beneath the refrigerant material.

In a preferred embodiment, the portable cooling containers are ice packs. Conventional ice packs comprise water and, optionally, property-enhancing additives such as, for example, antibacterial agents tightly sealed in a flexible enclosure or a rigid container. Ice packs can be conveniently chilled or frozen in a freezer or similar equipment.

The chilling apparatus may have multiple modules, each of which comprises a bottom plate and a thermally-conductive top plate, wherein each additional set of bottom and top plates (a chilling module) can be situated directly above the plates (modules) beneath it, thereby saving laboratory bench space.

In a preferred embodiment, multiple chilling modules can be stacked vertically, each base plate being supported by the structural elements located along the edges, or at the corners, of the module beneath it. In a particularly preferred embodiment, where the base plate is rectangular, structural elements are disposed at each of the four corners thereof to provide support in a stable stacking configuration. The structural elements can be, for example, supports having a rectangular or a cylindrical cross-section that extend vertically upward from the surface of a base plate, or a lower module.

Advantageously, the cooling/freezing apparatus provided herein can readily accommodate the placement of multiple samples (or sample containers, such as slides) in a compact configuration.

In another aspect, the subject invention provides a method of chilling samples, comprising providing the subject apparatus, inserting a refrigerant material into the refrigerant space between adjacent plates, and placing one or more samples on a thermally-conductive top plate.

In some embodiments, the apparatus provided herein can be used in applications in which samples require prolonged cooling and/or freezing. In specific embodiments, the samples are biological samples such as, for example, tissue and/or cells. In some embodiments, storage containers and sample carriers filled with the samples to be chilled are placed directly in contact with the thermally-conductive top plate. Non-limiting examples of containers and sample carriers include glass slides, culture plates, microplates, vials, petri dishes, and others containers that are commonly employed in the art.

In a preferred embodiment, the apparatus is used to chill and cure a polysaccharide gel, e.g., low-melting point agarose, used to encapsulate cells prior to lysis and electrophoresis in a comet assay. In a particularly preferred embodiment, 26 or fewer glass slides covered with low-melting point agarose ready to be cured can be chilled simultaneously on each top plate.

In one exemplary embodiment, the apparatus can be used to freeze and/or maintain frozen tissue samples for histological examination procedures including, but not limited to, staining and dissection. In another exemplary embodiment, the apparatus can be used to keep live cells in culture plates cold while exposing the cells to DNA damaging environments and agents in DNA repair studies. In yet another exemplary embodiment, the apparatus can be used to keep PCR microplates/tubes/vials cold during the preparation of a PCR reaction.

Although the preferred embodiments described herein are directed to comet assays, other types of assays may also be performed using embodiments of the present invention. For example, fluorescent in-situ hybridization (FISH) protocols which use DNA sequence specific probes such as those for detecting BCR-ABL (Philadelphia chromosome) can be processed using embodiments of the present invention with or without comet analysis. In yet another example, various immunohistochemical staining protocols can be performed on non-comet samples such as cells or tissue slides using embodiments of the present invention. Other types of assays may also be performed.

The examples and embodiments described herein are for illustrative purposes only and various modifications or changes in light thereof will be suggested to persons skilled in the art and are included within the spirit and purview of this application. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

As used in the specification and appended claims, directional terms, such as "top," "bottom," "up," "down," "upper," "lower," "proximal," "distal," and the like are used herein solely to indicate relative directions and are not otherwise intended to limit the scope of the invention or claims.

All patents, patent applications, provisional applications, and publications referred to or cited herein are incorporated by reference in their entirety, including all figures and tables, to the extent they are not inconsistent with the explicit teachings of this specification.

We claim:

1. A chilling apparatus, adapted to receive a refrigerant material, comprising:
   a base plate;
   at least one thermally conductive top plate having a continuous substantially flat upper surface, adapted to support a plurality of sample carriers, and a bottom surface;
   two or more supports extending from the base plate that support the top plate above the base plate;
   two or more fasteners connected to each of the two or more supports for maintaining the top plate above the two or more supports, the top plate being slidable along the two or more fasteners;
   a refrigerant space between the bottom surface of the at least one top plate and the base plate, adapted to receive the refrigerant material therein, and;

two or more springs respectively arranged on the two or more fasteners and in contact with the substantially flat upper surface of the top plate, to bias the top plate towards the base plate;

such that, when the refrigerant material is received in the refrigerant space, the two or more springs on the two or more fasteners bias the top plate towards the base plate, the top plate thereby maintaining thermal contact with the refrigerant material, whereby the plurality of sample carriers are in thermal contact with the refrigerant material through the top plate.

2. The chilling apparatus, according to claim 1, wherein the top plate comprises one or more of stainless steel, aluminum, copper, nickel, gold, and silver.

3. The chilling apparatus, according to claim 1, wherein the top plate comprises one or more non-metallic thermally conductive materials.

4. The chilling apparatus, according to claim 1, further comprising at least one side wall around the refrigerant space.

5. The chilling apparatus according to claim 1, wherein the base plate has a length of between 1 foot and 6 feet and a width of between 1 foot and 6 feet.

6. The chilling apparatus, according to claim 1, further comprising two or more apertures in the top plate and the two or more fasteners connect to the support through the two or more apertures.

7. A method for chilling a sample carrier comprising:
providing a chilling apparatus according to claim 1,
sliding a refrigerant material within the refrigerant space, so that the top plate slides along the two or more fasteners while the two or more springs arranged on the two or more fasteners simultaneously bias the top plate towards the refrigerant space and against the refrigerant material therein;
allowing the refrigerant material to cool the top plate;
positioning the plurality of sample carriers on the top plate with a portion of the sample carrier extending past the flat upper surface of the top plate.

8. The method, according to claim 7, further comprising:
grasping the portion of the sample carrier extending past the flat upper surface of the top plate to remove the sample carrier from the top plate.

9. The method, according to claim 8, wherein the sample carrier is a slide and the method comprises positioning the slide with one end extending past the flat upper surface of the top plate and grasping the end extending past the flat edge to remove the slide from the top plate.

10. A kit for chilling a sample carrier comprising:
a chilling apparatus, according to claim 1; and
a refrigerant material configured to moveably slide into the refrigerant space thereby moving the top plate on the two or more fasteners.

11. The kit, according to claim 10, further comprising at least one side wall around the refrigerant space.

12. The kit, according to claim 10, wherein the top plate has a thermal conductivity of 20 W/m·K.

13. The kit, according to claim 12, wherein the refrigerant material is within a flexible container that at least partially conforms to the shape of the refrigerant space when slid therein.

14. A chilling apparatus comprising:
a base plate;
at least one top plate having a continuous flat upper surface, adapted to support at least one sample carrier in a substantially level position on the flat upper surface, and a bottom surface, adapted to contact a refrigerant material;
a support extending from the base plate, wherein the top plate is above the support;
two or more fasteners connected to the support that slidably maintains the top plate above the support;
two or more springs respectively positioned on the two or more fasteners and in contact with the flat upper surface of the at least one top plate that biases the at least one top plate towards the base plate; and
a refrigerant space between the bottom surface of the at least one top plate and the base plate, adapted to hold the refrigerant material therein,
such that the two or more spring bias the at least one top plate, slidable along the two or more fasteners, towards the base plate, whereby the refrigerant material is compressed therebetween to maintain thermal connectivity with the top plate and the at least one sample carrier supported on the at least one top plate.

15. The chilling apparatus, according to claim 14, further comprising at least one side wall around the refrigerant space.

16. The chilling apparatus according to claim 14, wherein the base plate has a length of between 1 foot and 6 feet and a width of between 1 foot and 6 feet.

17. The chilling apparatus, according to claim 14, further comprising two or more apertures in the top plate and the two or more fasteners connect to the support through the two or more apertures.

18. The chilling apparatus, according to claim 14, further comprising a slidable drawer disposed between the base plate and the at least one top plate.

19. The chilling apparatus according to claim 18, further comprising a receptacle in the slidable drawer, adapted to house the refrigerant material.

20. The chilling apparatus according to claim 19, wherein the slidable drawer is removable from between the base plate and at least one top plate.

* * * * *